TUNER DEVICE FOR A RADIO OR TELEVISION RECEIVING APPARATUS

Filed Nov. 28, 1960 3 Sheets-Sheet 1

Inventors
Tsuneo Takahata
Tsuneo Utsunomiya by Hill, Sherman, Meroni, Gross & Simpson
Attys.

Inventors
Tsuneo Takahata
Tsuneo Utsunomiya by Hill, Sherman, Meroni, Gross & Simpson Attys.

TUNER DEVICE FOR A RADIO OR TELEVISION RECEIVING APPARATUS

Filed Nov. 28, 1960 3 Sheets-Sheet 3

Inventors
Tsuneo Takahata
Tsuneo Utsunomiya
by Hill, Sherman, Meroni, Gross, Simpson Attys.

United States Patent Office | 3,183,464 | Patented May 11, 1965

3,183,464
TUNER DEVICE FOR A RADIO OR TELEVISION RECEIVING APPARATUS

Tsuneo Takahata and Tsuneo Utsunomiya, Tokyo, Japan, assignors to Sony Corporation, a corporation of Japan

Filed Nov. 28, 1960, Ser. No. 72,186
Claims priority, application Japan, Nov. 30, 1959, 34/62,355; Dec. 21, 1959, 34/65,949 and 34/65,950; Jan. 14, 1960, 35/1,408 and 35/1,410
2 Claims. (Cl. 336—142)

This invention relates to tuner devices of the type used in radio or television receiving sets and more particularly relates to a tuner device employing an improved rotary switch.

In prior types of tuners employed in radio and television receiving sets, it has been the practice to employ rotary switches having a stepper mechanism which is constructed and assembled by springs, steel balls, rollers, and cams and the like for effecting switch stepping to facilitate selection of a desired circuit.

The ordinary rotary switch which has been employed in tuners in the past, however, is disadvantageous in that it is usually quite complicated in construction and comparatively large in size and is so arranged that objectionable mechanical vibrations are produced when the rotary switch is stepped from one circuit position to another.

It is a principal object of the present invention to provide a simple and compact rotary switch which may be advantageously employed in the tuner of a television or radio receiving set.

Another object of the invention resides in the provision of a rotary switch for a tuner which actuates smoothly from one circuit position to another without exhibiting objectionable mechanical vibrations.

Yet another object of the invention is directed to the provision of a tuner device employing a rotary switch which is designed to permit fine adjustment of a plurality of circuit coils associated with the rotary switch from the exterior of a tuner casing.

These and other objects, features and advantages of the present invention will become apparent from time to time as the following specification proceeds and with reference to the accompanying drawings, in which.

Figure 1:
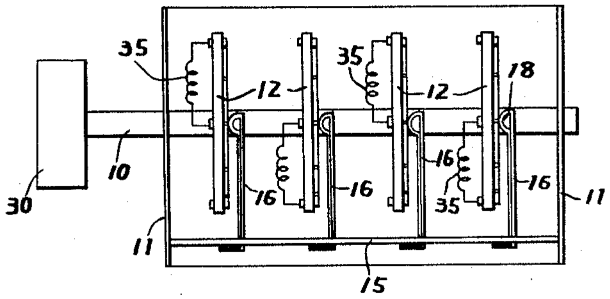
FIGURE 1 is a side elevational view of a tuner device employing a rotary switch constructed in accordance with the present invention.

In accordance with the invention, a rotary shaft 10 is journalled for rotatable movement in a pair of spaced upright supports 11 and has a plurality of spaced discs 12 mounted thereon for corotatable movement therewith.

A plurality of contact members 13 are coaxially mounted on the discs 12. Similarly, another set of contact members 14 are coaxially mounted on the discs 12 radially inwardly of the contact members 13. A print wiring base 15 extends between and is connected to the upright supports 11. Pairs of stationary contacts 16 and 17 extend upwardly from the base 15 and have contact points 18 which are engageable with the contact members 13 and 14 on each of the rotary discs 12. It will be understood that pairs of stationary contacts are provided for each of the discs but since each disc and its associated structure is identical to the others, only a single disc and its associated structure will be described in detail herein.

Figure 2:
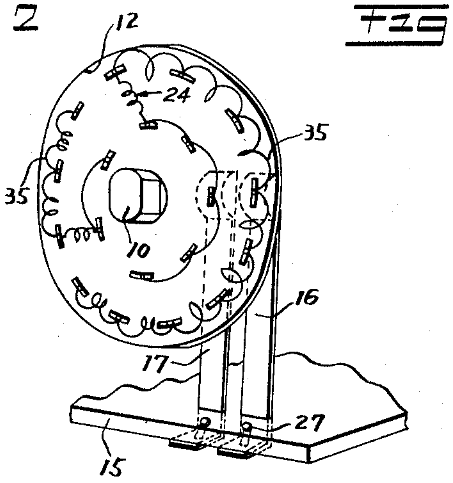
FIGURE 2 is an enlarged isometric view of a portion of the tuning device illustrated in FIGURE 1.
Figure 3:
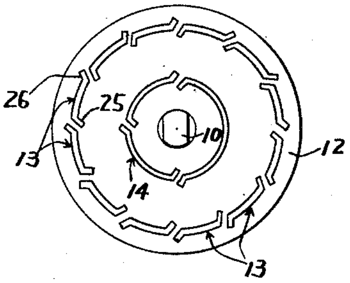
FIGURE 3 is a front elevational view of an insulated rotary disc.
Figure 4:
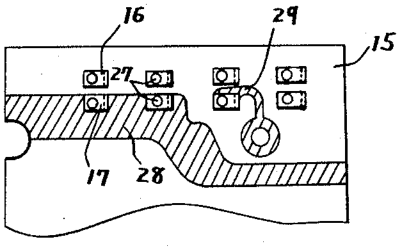
FIGURE 4 is an enlarged plan view of the bottom of a plate upon which the stationary contact points are mounted.
Figures 5, 6, 7:
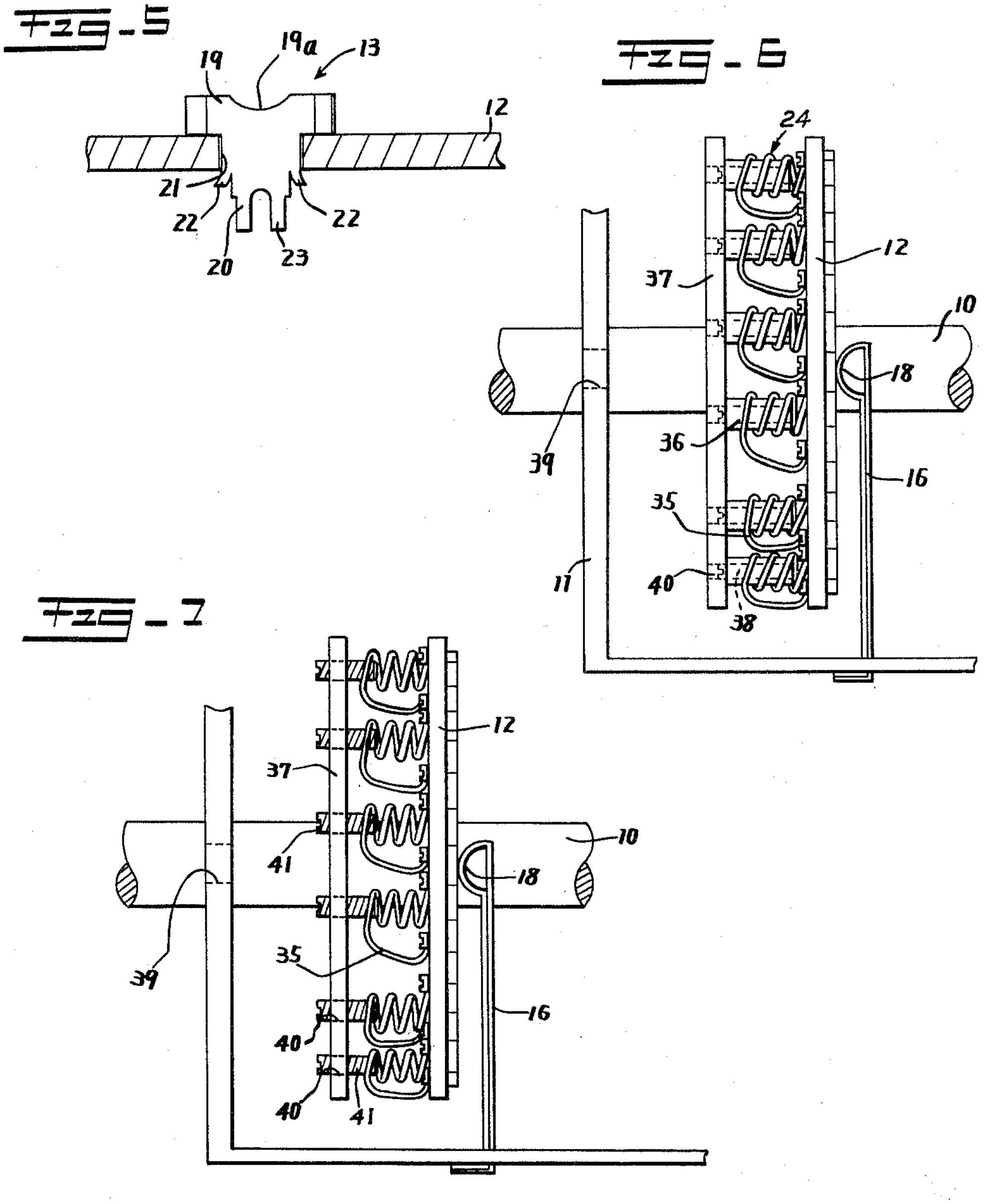
FIGURE 5 is an enlarged sectional view of a portion of the rotary disc illustrated in FIGURE 3 which shows how the multiple contact points on the rotary disc are connected to the disc.
FIGURE 6 is an enlarged side elevational view of a portion of a rotary switch which has been constructed in accordance with the principles of the present invention.
FIGURE 7 is an enlarged side elevational view of a portion of the rotary switch which is similar in nature to FIGURE 6 but which illustrates a different embodiment of the invention.

Referring particularly to FIGURE 5, the contact members 13 and 14 are generally T-shaped in configuration with heads 19 lying on one face of the discs 12 and with shanks 20 protruding through apertures 21 formed within the discs 12. Tongues 22 are formed on the shank 20 which are bent over the face of disc 12 adjacent the aperture 21 to firmly fix the contact members 13 in place. The lower end 23 of the shank 20 serves as a terminal to facilitate the connection of a lead wire thereto. The contact members 14 are identical in configuration to the contact members 13 and as illusrated diagrammatically in FIGURE 2, a coil 24 may interconnect each of the contact members 13 with one of the contact members 14. Thus a circuit may be completed through one of the contact members 13 and the contact member 14 to which it is electrically connected.

The heads 19 of the contact members 13 extend generally along a circle coaxial with the shaft 10 and have inturned and outturned nibs 25 and 26, respectively, extending from opposite ends thereof. The nibs 26 of each of the heads 19 lie along chord lines of the disc 12 and the nibs 25 of the adjacent heads 19 are spaced slightly from the nibs 26 but are disposed in parallel relationship therewith. The nibs 25 and 26 of the heads 19 are spaced the same distance from the face of the discs 12 but each of the heads has a recess 19*a* formed centrally therealong which serves as a seat for the contact point 18 of the stationary contact 16 to provide a means whereby the contact 16 can serve to resiliently lock the disc 12 in a desired rotated position.

The lower ends of the stationary contacts 16 and 17 extend at right angles from the upstanding portions thereof and are affixed by means of rivets 27 to the base 15. The under surface of the block 15 may have printed circuits 28 and 29 thereon which are electrically connected to the inturned ends of the contacts 16 and 17, respectively. In this manner an electrical circuit may be completed through the printed circuit 28, stationary contact 16, contact member 13, coil 24, contact member 14, contact 17, and printed circuit 28.

An adjusting knob 30 is mounted on the outer end portion of the shaft 10 to facilitate rotation of the shaft. As the shaft 10 is rotated successive contacts 13 and 14 are moved into engagement with the contact points 18 of the stationary contacts 16 and 17, respectively. As the contact point 18 of the stationary contact 16 drops into the recess 19*a* formed in the center portion of the contacts 13, the disc 12 will be maintained in a given rotated position by the resiliency of the stationary contact 16. The portions 25 and 26 of the contacts 13 and 14, however, are positioned close enough to one another so that the contact point 10 will not be dropped into the gap formed between the adjacent contact members.

As a result, the changeover operation wherein successive contacts 13 and 14 are moved into engagement with stationary contacts 16 and 17, can be smoothly achieved with a very small torque required to effect rotation of the shaft 10. Additionally, there is no need of a separate stepper mechanism so that a tuner constructed in accordance with the principles of the present invention can be more economically and expeditiously manufactured.

Since there is no appreciable mechanical shock during rotation of the shaft 10, a device constructed in accordance with the principles of this invention is particularly suited for use with a tuner employing transistors which are susceptible to mechanical fatigue. Still further, the contact resistance between the movable and stationary contact points is quite small due to good surface contact therebetween. There is no undesirable transient current in the transistor because of the fact that the collector current of the transistor will not be cut off by the continuous contact between the contact point 10 and contact points 13 and 14 during the change-over operation.

FIGURE 6 illustrates a manner in which the coils 24 interconnecting the contacts 13 and 14 may be mounted on the insulator disc 12. A plurality of coils 35 are mounted on the front surface of the disc 12 and have their opposite ends connected respectively to the terminals 23 of successive contact members 13 and 14. The coils will have different electrical characteristics corresponding to different tuner circuits so that the circuits may be changed by rotating the shaft 10 to move different contact members into engagement with the stationary contacts.

A plurality of cylindrical non-conductive and insulative bobbins 36 are mounted on the front surface of the plate 12 and are sandwiched between that plate and an insulator plate 37 which is affixed to the shaft 10. It will be noted that the coils 35 are wound around these bobbins and that a metallic adjusting screw 38 is threadedly mounted in each bobbin. The adjusting screws 38 may be formed of a material having a minus permeability such as brass or a plus permeability such as a ferrite core. Accordingly, by screwing the screws into or out of their respective bobbins the electrical characteristics of the coils 35 can be varied as desired.

If so desired, that insulator disc 37 and the bobbins 36 can be formed integrally with one another by molding them in a single unit out of a material such as polyethylene or nylon.

A housing, not shown, might be fitted over the switch parts and be so formed that the supports 11 and 12 constitute its end walls, since it may be desirable to maintain the switch relatively dust free. We have accordingly provided means whereby the screws 38 can be adjusted without removing the housing. An aperture 39 is formed in the front upright support 11 to provide a means whereby an elongated screw driver may be inserted into the interior of housing and thence through an aperture 40 in the front plate 37 to facilitate adjustment of the screws 38.

In the embodiment of the invention illustrated in FIGURE 7, the coils 35 are simply disposed on the front surface of the insulator plate 12 with their axes in registry with the center axes of the apertures 40 and adjusting screws 41, like the adjusting screws 38, are screw threaded into the insulator plate 37 affixed to the shaft 10 so that they can be moved axially within the coils 35.

While the embodiment of the invention illustrated in FIGURE 7 is preferable from the standpoint of cost, the embodiment illustrated in FIGURE 6 is particularly adapted to a tuner circuit employing transistors since the coils can be securely mounted within the rotary switch and thereby prevent it from being subjected to undesirable mechanical vibrations.

Figure 8:
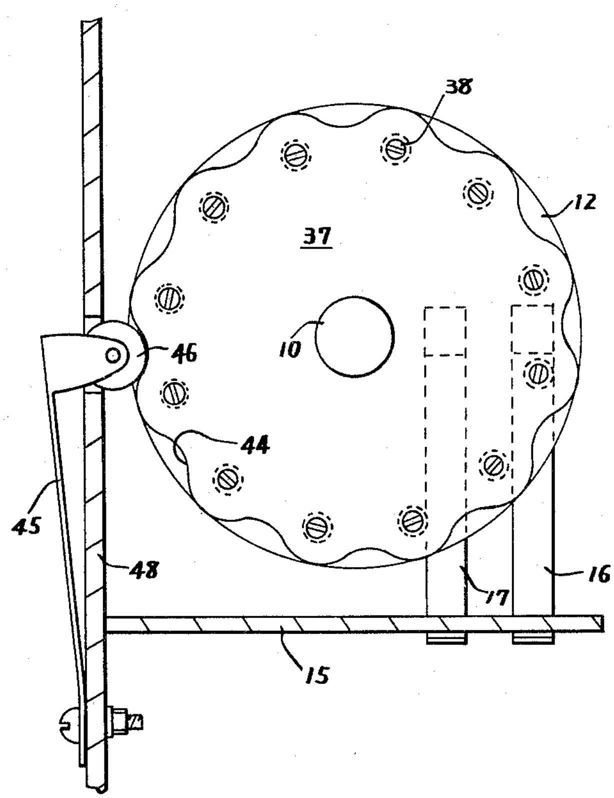
FIGURE 8 is a front elevational view of a portion of the rotary switch which illustrates an alternative means by which switch stepping may be controlled.

FIGURE 8 illustrates a supplemental means for effecting switch stepping. As viewed in FIGURE 8, the insulator disc 37 is formed as a serrated wheel with a plurality of concavities 44. A resilient lever arm 45 is mounted on a casing wall 48 and has a roller 46 mounted on the free end thereof which is cooperable with the periphery of the insulator plate 37 to provide a means for positively but resiliently maintaining the shaft 10 and the plates connected thereto in successive desired rotated position.

It will be understood that these embodiments of the invention have been used for illustrative purposes only and that various modifications and variations in the invention may be effected without departing from the spirit and scope of the novel concepts thereof.

We claim as our invention:

1. A rotary switch comprising a support, a shaft journalled within said support, means for rotating said shaft, an insulated disc mounted on said shaft, a plurality of circumferentially spaced contact members affixed to said disc having inturned and outturned portions with respect to the center of the disc respectively at opposite ends thereof and having recesses formed centrally therealong, a resilient stationary contact connected to one side of a power line and biased into engagement with a contact member and having a contact point positionable within said recesses so that rotation of said shaft will move said contact member successively into engagement with said contact, inductance elements connected to said contact members, means interconnecting said elements with the opposite side of said power line, a disc element affixed to said shaft having a plurality of concavities formed in the periphery thereof, a member positionable within said concavities, and means resiliently biasing said member into said concavities to positively but resiliently maintain said shaft in a desired rotated position.

2. A rotary switch comprising a support, a shaft journalled on said support, means for rotating said shaft, an insulated disc mounted on said shaft for rotation therewith, a plurality of contact members in the form generally of annular segments mounted on said disc in circumferentially spaced relation, each of said annular segmental contact members having in-turn and out-turn portions with respect to the center of the disc respectively formed at opposite ends thereof and each having a recess formed in the surface thereof intermediate said ends, a stationary contact connected to one side of an electric line and resiliently mounted on said support and biased into engagement with a contact member, said stationary contact having a contact point positionable within said recesses so that rotation of said shaft will move successive contact members into engagement with said stationary contact, one of said portions of each of said contact members lying along a chord line of said disc and the adjacent portion of each of the adjacent contact members being disposed in parallel with portions lying along a chord line of said disc, a plurality of impedance elements corresponding in number to the number of said contact members and each having one end thereof connected to one of said contact members respectively, and means for connecting the other end of each impedance element to the other side of said electric line.

References Cited by the Examiner

UNITED STATES PATENTS

| | | | |
|---|---|---|---|
| 1,205,549 | 11/16 | Kruesheld | 200—166 |
| 2,423,152 | 7/47 | Mitchell | 336—142 |
| 2,543,560 | 2/51 | Thias | 336—142 |
| 2,551,228 | 5/51 | Achenbach | 200—14 |
| 2,614,248 | 10/52 | Ostreicher | 336—150 X |
| 2,657,365 | 10/53 | Lazzery | 336—142 |
| 2,718,623 | 9/55 | Yoder et al. | 336—142 X |
| 2,794,080 | 5/57 | Stoecklin | 200—166 X |
| 2,898,563 | 8/59 | De Cola et al. | 336—142 |
| 2,900,461 | 8/59 | Allison | 200—11 |

FOREIGN PATENTS

| | | |
|---|---|---|
| 632,625 | 11/49 | Great Britain. |

JOHN F. BURNS, *Primary Examiner.*

MILTON O. HIRSHFIELD, *Examiner.*